(12) United States Patent
Pfertner et al.

(10) Patent No.: US 6,676,194 B2
(45) Date of Patent: Jan. 13, 2004

(54) WINDOW ARRANGEMENT FOR A VEHICLE

(75) Inventors: Kurt Pfertner, Ditzingen (DE); Reiner Armbruster, Muehlacker (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/227,539

(22) Filed: Aug. 26, 2002

(65) Prior Publication Data

US 2003/0057735 A1 Mar. 27, 2003

(30) Foreign Application Priority Data

Aug. 25, 2001 (DE) .......................... 101 41 788

(51) Int. Cl.[7] .................................. B60J 1/00
(52) U.S. Cl. .................. 296/146.15; 296/93; 296/201; 49/480.1; 248/31
(58) Field of Search ................... 296/146.15, 206, 296/93, 201; 49/475.1, 480.1; 428/31

(56) References Cited

U.S. PATENT DOCUMENTS

| | | | | |
|---|---|---|---|---|
| 3,981,697 A | * | 9/1976 | Buckthorpe ............ 52/204.597 |
| 4,278,286 A | * | 7/1981 | Kiba et al. .................... 296/93 |
| 4,532,741 A | * | 8/1985 | Knudel ........................... 52/99 |
| 4,840,001 A | * | 6/1989 | Kimisawa ..................... 52/208 |
| 5,233,805 A | * | 8/1993 | Hirai et al. ............. 52/204.597 |
| 5,358,764 A | * | 10/1994 | Roberts et al. ................ 428/31 |
| 5,396,746 A | * | 3/1995 | Whitmer ....................... 52/208 |
| 6,022,065 A | | 2/2000 | Stopp et al. ........... 296/146.15 |
| 6,279,989 B1 | | 8/2001 | Marchart et al. ........... 296/197 |
| 2003/0000162 A1 | * | 1/2003 | Gaiser et al. ............... 52/204.5 |

FOREIGN PATENT DOCUMENTS

| | | |
|---|---|---|
| DE | 3501916 A1 | 7/1986 |
| DE | 4129492 A1 | 1/1993 |
| DE | 197 05 132 A1 | 8/1998 |
| DE | 198 37 308 A1 | 2/2000 |
| DE | 199 12 105 A1 | 9/2000 |
| FR | 2 581 606 A1 | 12/1986 |
| GB | 2152124 A | 7/1985 |

* cited by examiner

Primary Examiner—Stephen T. Gordon
Assistant Examiner—Patricia L. Engle
(74) Attorney, Agent, or Firm—Crowell & Moring LLP

(57) ABSTRACT

A window arrangement for a vehicle has a viewing window and a window support frame which is fastened to the interior side of the window facing a vehicle interior, the window arrangement also having a sealing strip for the window edge, which sealing strip is fastened by means of a fastening extension to the window support frame. In order to permit a fast mounting of the sealing strip on the viewing window, the window support frame has a receiving recess for the fastening extension of the sealing strip, the fastening extension being held by at least one clamping element in the receiving recess.

28 Claims, 1 Drawing Sheet

WINDOW ARRANGEMENT FOR A VEHICLE

BACKGROUND AND SUMMARY OF THE INVENTION

This application claims the priority of Application No. 101 41 788.8, filed Aug. 25, 2001, in Germany, the disclosure of which is expressly incorporated by, reference herein.

The invention relates to a window arrangement for a motor vehicle, having a viewing window and a window support frame which is fastened to the interior side of the window facing a vehicle interior, the window arrangement also having a sealing strip for the window edge, which sealing strip is fastened by means of a fastening extension to the window support frame.

A window arrangement of the above-mentioned type for a motor vehicle is known from German Patent Document DE 199 12 105 A1 (U.S. Pat. No. 6,279,989) and comprises a viewing window and a window support frame arranged on the interior side of the window, the interior side of the window facing the vehicle interior. In addition, the window arrangement has a sealing strip which reaches around the window edge and which has a fastening extension which holds it on the window support frame.

It is an object of the invention to provide a simple fastening of the sealing strip in the case of a window arrangement of the initially mentioned type.

This object is achieved according to preferred embodiments of the invention by means of a window arrangement for a vehicle, having a viewing window and a window support frame which is fastened to the interior side of the window facing a vehicle interior, the window arrangement also having a sealing strip for the window edge, which sealing strip is fastened by means of a fastening extension to the window support frame, wherein the window support frame has a receiving recess for the fastening extension of the sealing strip, and in that the fastening extension is held by means of at least one clamping element in the receiving recess. Additional characteristics further developing the invention are indicated below and in the claims.

Principal advantages achieved by means of the invention are that, by fastening the sealing strip by means of the clamping element, a rapid and simple as well as cost-effective mounting of the window arrangement is obtained. Furthermore, the clamping fastening according to the invention advantageously results in an adjusting possibility of the sealing strip relative to the edge of the viewing window, whereby, in addition, the desired gap measurement is coordinated between the sealing strip and the vehicle body area surrounding the window.

In certain preferred embodiments, the depth (t) of the receiving recess corresponds approximately to the length (L) of the fastening extensions. By means of the characteristics indicated, the adjusting possibility of the sealing strip relative to the viewing window can advantageously be applied in a large area, whereby corresponding tolerances can be compensated.

Particularly simple advantageous clamping variants for the fastening extension in the receiving recess include forming the clamping element as a wedge and providing the receiving recess with an inclined plane as a clamping slope.

By means of the above-mentioned adjusting possibility of the sealing strip with respect to the edge of the viewing window, according to a further development wherein a sealing lip is mounted on the sealing strip which sealing lip interacts with the edge area of the body area of the vehicle which surrounds the window arrangement. This provides a defined sealing of the sealing lip with respect to the vehicle body area surrounding the window arrangement.

A particularly preferred embodiment of the window arrangement is distinguished by a fixing device which is arranged at one of the receiving recesses, the clamping element and the fastening extension. By means of the fixing device, the clamping element is securely and durably held in the receiving recess. The sealing strip will therefore be securely fastened. The fixing device is preferably formed by an adhesive tape and/or a felt strip. Optionally, the clamping element may also be fixed in the receiving recess by means of a hardening liquid glue or the like.

Other objects, advantages and novel features of the present invention will become apparent from the following detailed description of the invention when considered in conjunction with the accompany drawings.

DETAILED DESCRIPTION OF THE DRAWINGS

Figure 1:
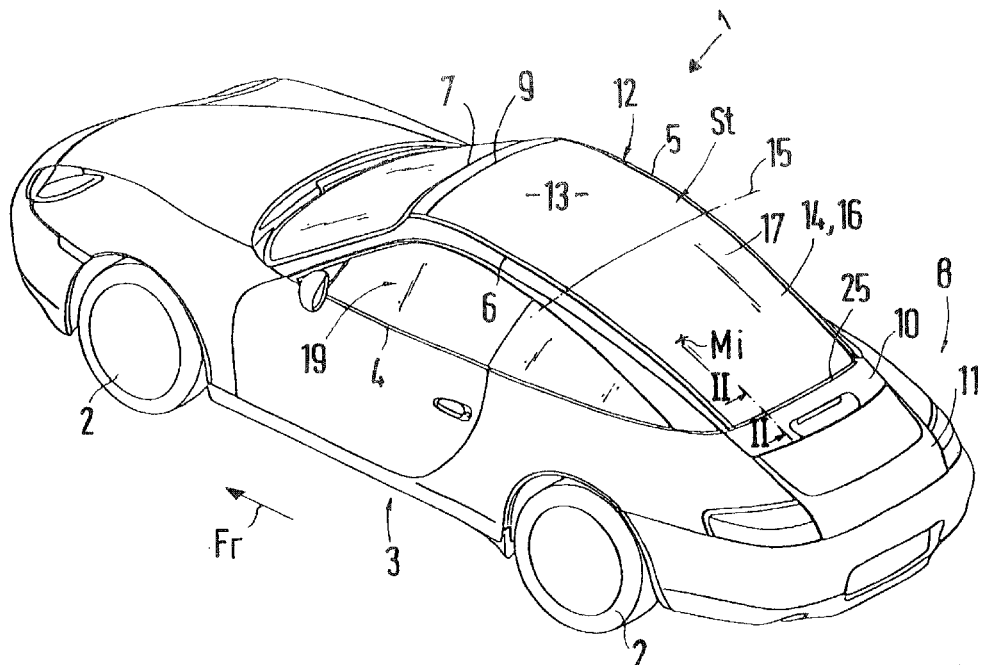
FIG. 1 is a perspective view of a vehicle with a window arrangement constructed according to a preferred embodiment of the present invention.

FIG. 1 illustrates a vehicle 1, particularly a passenger car, having a vehicle body 3 carried by wheels 2, which vehicle body 3 has roof side members 5 and 6, which extend in a curved manner above a belt line 4, start out from corner areas of a windshield frame 7, and extend into the rear area 8 of the vehicle 1, so that the vehicle has the shape of a coupe with a fast back. A roof opening 9 is bounded by a cross member of the windshield frame 7, the roof side members 5 and 6 and a vehicle body element 10 which is arranged in the rear area 8 and is situated between an engine cover 11 and the rear-side area of the belt line 4. In the roof opening 9, a roof arrangement 12 is provided which is preferably constructed as a roof module which can be placed in the roof opening and comprises at least a forward cover 13 which closes off the roof opening 9 and opens it up at least partially, and, for example, a rear part 14. The cover 13 can be lowered from its closed position St and can then be pushed under the rear part 14. The rear part 14 can preferably be opened against the driving direction Fr in the manner of a tail gate about a swivelling axis 15 which is only outlined here.

Figure 2:
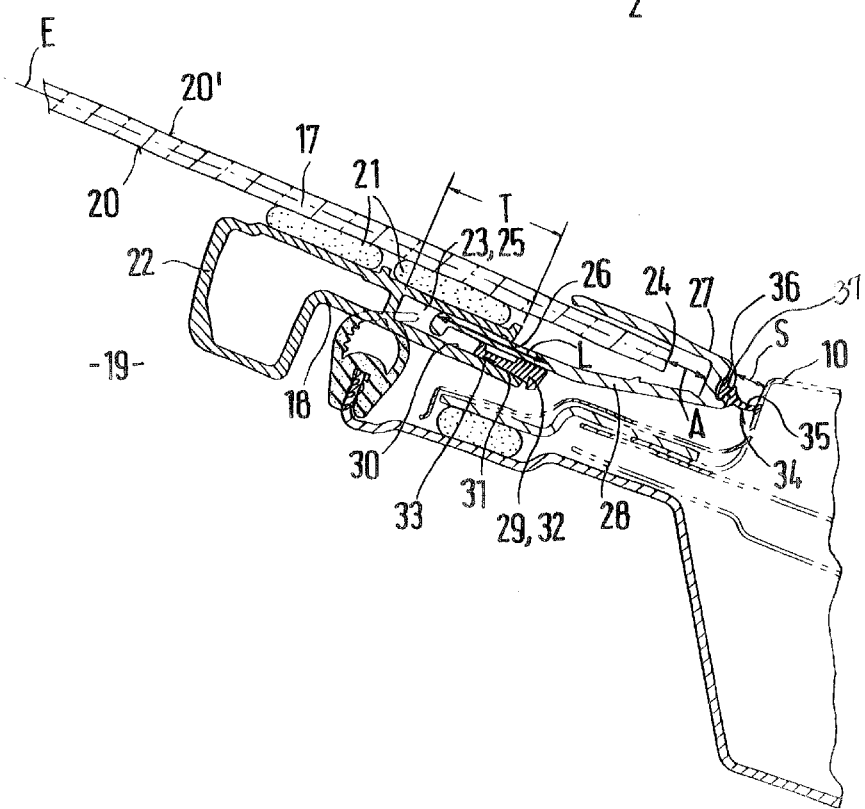
FIG. 2 is a partial sectional view of the window arrangement along line II—II in FIG. 1.

The rear part 14 comprises a window arrangement 16 which has a transparent viewing window 17 and a window support frame 18 which carries the viewing window 17, as illustrated in FIG. 2. The window support frame 18 is fastened to the interior side 20 of the window facing the vehicle interior 19. For this purpose, preferably at least one gluing line 21 is provided. The window support frame 18 may extend in a surrounding manner particularly in the window edge area on the interior side 20 and be formed, for example, by a hollow profile 22 which has at least one profile chamber 23 which has an open construction in the direction of the rearward-side window edge 24. The support frame 18 comprises a receiving recess 25 which is preferably formed by the open profile chamber 23. The receiving recess 25 accommodates a fastening extension 26 of a sealing strip 27 which has an essentially U-shaped cross-section and can therefore be pushed over the window edge 24, and thus reaches in areas over the interior side 10 and the exterior side 20' of the window. The fastening extension 26, starts out, preferably in one piece, from the leg 28 of the U-profile of the sealing strip 27 situated adjacent to the interior side 20 of the window. In order to hold the fastening extension 26 and thus also the sealing strip 27 on the viewing window 17; a clamping element 29 is inserted into the receiving recess 25, which clamping element 29 holds the fastening extension 26 in a clamping manner inside the receiving recess 25.

For the clamping, an inclined plane 31 may be provided as a clamping slope on the interior wall 30 of the receiving recess 25, which clamping slope interacts with the clamping element 29. In addition or as an alternative, the clamping element 29 may be implemented as a clamping wedge 32. For holding the clamping element 29 in the receiving recess 25, a fixing device may additionally be provided which is formed, for example, by an adhesive tape and/or a felt strip 33, which is arranged on the interior wall 30 and/or on the clamping element 29. Several clamping elements 29 may be provided along the window edge 24 in order to fix the sealing strip 27 to several points at the window support frame 18.

The receiving recess 25 extends in its depth T approximately parallel to the plane E of the viewing window 17, the depth T of the receiving recess 25 measured in the direction of the center Mi of the window corresponding approximately to the length L of the fastening extension 26. It is advantageous in this case that the sealing strip 27 can be adjusted with respect to its distance A from the window edge 24, so that a gap 34 existing between the sealing strip 27 and the vehicle body area 10 can be adjusted to a desired gap measurement S depending on how deeply the fastening extension 26 is pushed into the receiving recess 25. When the desired gap measurement S has been reached, the clamping element 29 is inserted into the recess 25. In addition, a sealing lip 35 can be fastened to the sealing strip 27 in order to bridge the gap 34. For the fastening of the sealing lip 35, a dovetail-type recess 36 is provided at the sealing strip 27, into which a corresponding contour 37 of the sealing lip 35 engages which reaches behind it.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Window arrangement for a vehicle, having a viewing window and a window support frame which is fastened to the interior side of the window facing a vehicle interior, the window arrangement also having a sealing strip for the window edge, which sealing strip is fastened by means of a fastening extension to the window support frame,
   wherein the window support frame has a receiving recess for the fastening extension of the sealing strip, and
   wherein the fastening extension is held by at least one clamping element in the receiving recess which clamping element is separate from the fastening extension.

2. Window arrangement according to claim 1,
   wherein the receiving recess extends in its depth approximately parallel to the viewing window plane.

3. Window arrangement according to claim 1,
   wherein the depth of the receiving recess corresponds approximately to the length of the fastening extension.

4. Window arrangement according to claim 2,
   wherein the depth of the receiving recess corresponds approximately to the length of the fastening extension.

5. Window arrangement according to claim 1,
   wherein the clamping element is a clamping wedge.

6. Window arrangement according to claim 1,
   wherein the receiving recess has an inclined plane as a clamping slope.

7. Window arrangement according to claim 1, wherein a sealing lip is mounted on the sealing strip, which sealing lip interacts with the edge area of the body area of the vehicle which surrounds the window arrangement.

8. Window arrangement according to claim 2, wherein a sealing lip is mounted on the sealing strip, which sealing lip interacts with the edge area of the body area of the vehicle which surrounds the window arrangement.

9. Window arrangement according to claim 3, wherein a sealing lip is mounted on the sealing strip, which sealing lip interacts with the edge area of the body area of the vehicle which surrounds the window arrangement.

10. Window arrangement according to claim 4, wherein a sealing lip is mounted on the sealing strip, which sealing lip interacts with the edge area of the body area of the vehicle which surrounds the window arrangement.

11. Window arrangement according to claim 5, wherein a sealing lip is mounted on the sealing strip, which sealing lip interacts with the edge area of the body area of the vehicle which surrounds the window arrangement.

12. Window arrangement according to claim 6, wherein a sealing lip is mounted on the sealing strip, which sealing lip interacts with the edge area of the body area of the vehicle which surrounds the window arrangement.

13. Window arrangement according to claim 1, wherein a fixing device for the clamping element is arranged at the receiving recess or the clamping element.

14. Window arrangement according to claim 13,
    wherein the fixing device is one of an adhesive tape and a felt strip.

15. Window arrangement according to claim 2, wherein a fixing device for the clamping element is arranged at the receiving recess.

16. Window arrangement according to claim 3, wherein a fixing device for the clamping element is arranged at the receiving recess or the clamping element.

17. Window arrangement according to claim 5, wherein a fixing device for the clamping element is arranged at the receiving recess or the clamping element.

18. Window arrangement according to claim 6, wherein a fixing device for the clamping element is arranged at the receiving recess or the clamping element.

19. Window arrangement according to claim 7, wherein a fixing device for the clamping element is arranged at the receiving recess or the clamping element.

20. A vehicle window assembly comprising:
    a window pane support frame with a receiving recess,
    a sealing lip member,
    a fastening member supporting the lip member and including an extension which, in use, extends into the receiving recess, and
    a clamping element in the receiving recess which is separate from the fastening member extension and operable to clamp the extension to the support frame.

21. An assembly according to claim 20, wherein the receiving recess extends in its depth approximately parallel to the viewing window plane.

22. An assembly according to claim 20, wherein the depth of the receiving recess corresponds approximately to the length of the fastening extension.

23. An assembly according to claim 21, wherein the depth of the receiving recess corresponds approximately to the length of the fastening extension.

24. An assembly according to claim 20, comprising one of an adhesive tape and a felt strip operable to fix the clamping element to the receiving recess.

25. A vehicle window assembly comprising:

a window pane support frame with a receiving recess, a sealing lip member, a fastening member supporting the lip member and including an extension which, in use, extends into the receiving recess, a clamping element in the receiving recess operable to clamp the extension to the support frame, and one of an adhesive tape and a felt strip operable to fix the clamping element to the receiving recess.

26. A vehicle window assembly comprising:

a window pane support frame with a receiving recess, a sealing lip member, a fastening member supporting the lip member and including an extension which, in use, extends into the receiving recess, and clamping means separate from the fastening extension and disposed in the receiving recess for clamping the extension to the support frame while accommodating adjusting movement of the extension with respect to the support frame.

27. A vehicle window assembly according to claim 26, wherein said clamping means includes a clamping wedge.

28. A vehicle window assembly according to claim 27, comprising:

an adhesive means interposed between the clamping wedge and at least one facing surface of the receiving recess.

* * * * *